(12) United States Patent
Stefani

(10) Patent No.: US 9,555,773 B2
(45) Date of Patent: Jan. 31, 2017

(54) ELECTRIC POWER ASSISTED DRIVE, IN PARTICULAR A WIPER DRIVE

(75) Inventor: Siegfried Stefani, Oberriexingen (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 260 days.

(21) Appl. No.: 13/254,608

(22) PCT Filed: Mar. 22, 2010

(86) PCT No.: PCT/EP2010/001783
§ 371 (c)(1),
(2), (4) Date: Sep. 2, 2011

(87) PCT Pub. No.: WO2010/108645
PCT Pub. Date: Sep. 30, 2010

(65) Prior Publication Data
US 2012/0000303 A1   Jan. 5, 2012

(30) Foreign Application Priority Data

Mar. 25, 2009   (DE) .................. 10 2009 014 312

(51) Int. Cl.
| | | |
|---|---|---|
| *B60S 1/26* | (2006.01) | |
| *B60S 1/16* | (2006.01) | |
| *F16H 55/17* | (2006.01) | |
| *F16H 1/16* | (2006.01) | |

(52) U.S. Cl.
CPC .............. *B60S 1/166* (2013.01); *B60S 1/26* (2013.01); *F16H 55/17* (2013.01); *F16H 1/16* (2013.01); *Y10T 74/18792* (2015.01); *Y10T 74/19167* (2015.01)

(58) Field of Classification Search
CPC .............. B60S 1/166; B60S 1/08; B60S 1/18; B60S 1/26; B60S 1/185; H02K 7/1166; H02K 11/0015; F16H 1/16; F16H 1/20; F16H 27/08

USPC . 74/425, 421 R, 412 R, 416, 25, 33, 63, 89, 74/89.14, 89.16, 96
See application file for complete search history.

(56) References Cited

U.S. PATENT DOCUMENTS

| | | | | |
|---|---|---|---|---|
| 2,560,000 | A * | 7/1951 | Sacchini | 318/251 |
| 2,719,440 | A * | 10/1955 | Banker | 74/731.1 |
| 3,205,723 | A * | 9/1965 | Erlenbach | 74/50 |
| 3,915,027 | A * | 10/1975 | Simmons et al. | 74/473.1 |
| 3,929,029 | A * | 12/1975 | Kelbel | 74/473.21 |

(Continued)

FOREIGN PATENT DOCUMENTS

| | | |
|---|---|---|
| DE | 101 49 218 A1 | 5/2003 |
| DE | 698 12 520 T2 | 9/2003 |

(Continued)

OTHER PUBLICATIONS

International Search Report w/translation from PCT/EP2010/001783 dated Jul. 6, 2010 (6 pages).

*Primary Examiner* — William Kelleher
*Assistant Examiner* — Gregory Prather
(74) *Attorney, Agent, or Firm* — Osha Liang LLP

(57) ABSTRACT

Electromotive auxiliary drive, particularly a wiper drive, with an electric motor and a downstream gear forming an output shaft of the auxiliary drive, presenting at least two gear stages arranged in series in a drive train between the electric motor and the output shaft, of which one first gear stage is designed in the manner of a worm gear consisting of a worm and of a gearwheel or worm wheel interacting with this worm.

13 Claims, 5 Drawing Sheets

(56) References Cited

U.S. PATENT DOCUMENTS

| | | | |
|---|---|---|---|
| 4,449,416 A * | 5/1984 | Huitema | 74/336 R |
| 4,531,623 A * | 7/1985 | Arai et al. | 192/82 R |
| 4,543,839 A * | 10/1985 | Buchanan, Jr. | B60S 1/16 74/437 |
| 5,363,713 A * | 11/1994 | Pearson | 74/425 |
| 5,907,885 A * | 6/1999 | Tilli | B60S 1/185 15/250.15 |
| 5,979,256 A * | 11/1999 | Kilker et al. | 74/89.16 |
| 6,082,514 A * | 7/2000 | Averill | 192/69.42 |
| 6,179,040 B1 * | 1/2001 | Aoki et al. | 164/113 |
| 6,318,206 B1 * | 11/2001 | Kramer et al. | 74/473.37 |
| 6,389,919 B1 * | 5/2002 | Hennequet et al. | 74/473.37 |
| 6,619,153 B2 * | 9/2003 | Smith et al. | 74/473.37 |
| 6,788,048 B2 * | 9/2004 | Hedayat et al. | 324/202 |
| 7,311,015 B2 * | 12/2007 | Kluge | 74/337.5 |
| 7,353,726 B2 * | 4/2008 | Beer et al. | 74/340 |
| 7,581,467 B2 * | 9/2009 | Peterman et al. | 74/606 R |
| 7,810,627 B2 * | 10/2010 | Saitoh | 192/219.5 |
| 7,814,806 B2 * | 10/2010 | DeVore et al. | 74/335 |
| 8,037,780 B2 * | 10/2011 | Caenazzo et al. | 74/473.37 |
| 8,286,526 B2 * | 10/2012 | Englund et al. | 74/473.37 |
| 8,342,053 B2 * | 1/2013 | Matsushita et al. | 74/473.36 |
| 8,413,537 B2 * | 4/2013 | Garabello et al. | 74/473.37 |
| 8,505,403 B2 * | 8/2013 | Bowen et al. | 74/335 |
| 8,549,948 B2 * | 10/2013 | Hoering et al. | 74/473.37 |
| 8,776,631 B2 * | 7/2014 | Hada et al. | 74/473.37 |
| 2004/0041477 A1 * | 3/2004 | Moench et al. | 310/83 |
| 2004/0103735 A1 * | 6/2004 | Bruhn | 74/425 |
| 2004/0108168 A1 * | 6/2004 | Bathe et al. | 184/6.12 |
| 2004/0177714 A1 * | 9/2004 | Ronge | 74/473.37 |
| 2007/0209466 A1 * | 9/2007 | Garabello et al. | 74/473.37 |
| 2008/0017469 A1 * | 1/2008 | Iwasaki et al. | 192/48.5 |
| 2008/0178700 A1 * | 7/2008 | Harmos et al. | 74/473.37 |
| 2008/0295634 A1 * | 12/2008 | Olds et al. | 74/473.37 |
| 2013/0255408 A1 * | 10/2013 | Tokizaki | B60S 1/166 74/42 |

FOREIGN PATENT DOCUMENTS

| | | |
|---|---|---|
| EP | 0 792 779 A1 | 9/1997 |
| WO | 2004/026643 A1 | 4/2004 |

* cited by examiner

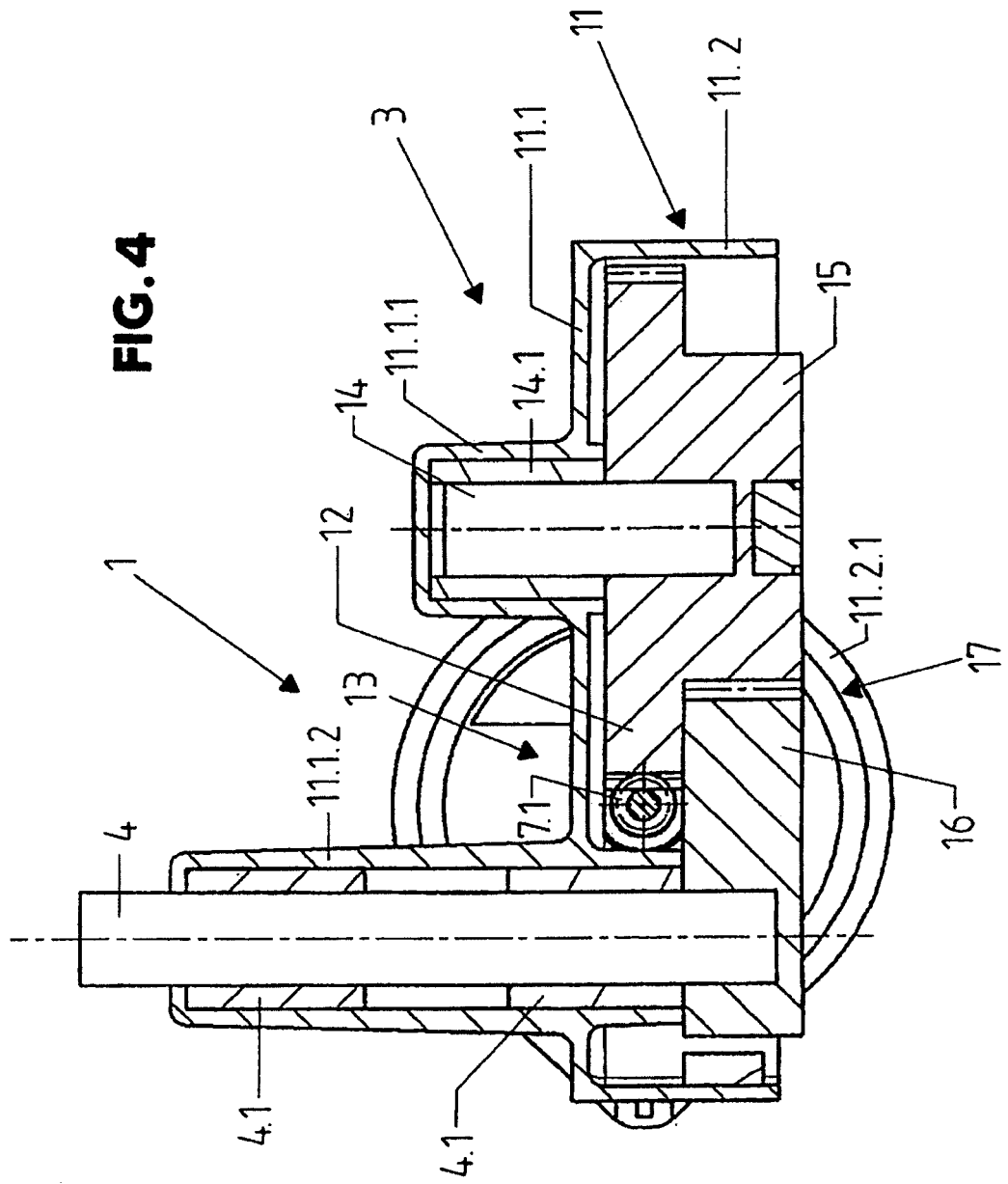

ELECTRIC POWER ASSISTED DRIVE, IN PARTICULAR A WIPER DRIVE

The invention refers to an electromotive auxiliary drive according to the generic term in patient claim 1 and in this case particularly to a wiper drive or windscreen wiper motor.

Electromotive auxiliary drives for vehicles are among other things known as actuators for different applications, particularly however also as a wiper drive or motor and fundamentally consist of an electric motor with a downstream and flanged gear that forms the output shaft of the auxiliary drive. Electromotive auxiliary drives are known in which a multiplication or gear stage designed in the manner of a worm gear is provided in the drive train between the electromotor and the shaft of the electromotor and the output shaft.

It is furthermore known to design wiper drives or motors in such a manner that with activated drive, the pinion shaft or output shaft of the gear is driven in reversing motion, i.e. periodically in different directions of rotation and to be more precise, either by means of corresponding control of the electric motor by an electric or electronic motor control unit of the auxiliary drive or by means of appropriate design of the gear or of a gear stage as a coupled gear (DE 101 49 218 A1).

The purpose of the invention is to demonstrate an electromotive auxiliary drive, which with a compact construction and improved energy efficiency makes an increased torque available on its pinion shaft or output shaft. In order to solve this problem, an electromotive auxiliary drive according to patent claim 1 is developed.

The auxiliary drive according to the invention consists for instance of a wiper drive or motor and in this case preferably a reversing wiper drive or motor. The second multiplication or gear stage additionally provided in the drive train and accommodated in the gear housing, results in the possibility of making an increased torque available on the output shaft of the auxiliary drive and/or of considerably improving self-locking of the gear, particularly also in case of design of the first gear stage as a worm gear-like gear stage.

An adequate level of self-locking of the gear is necessary or at least advisable among other aspects in case of design of the auxiliary drive as a wiper drive or motor in order to prevent a wiper arm located in the parked position for example being forced out of its parked position and damaged at a high road speed or by driven cleaning elements in carwashes.

The additional second gear stage furthermore results in an improvement in energy efficiency and to be more precise by extending the acceleration and deceleration window of the electric motor in case of electrically controlled reversing design of the auxiliary drive.

The additional second gear stage, which is designed as a gear train-like gear stage, may be realised together with the gear elements of the first gear stage in a compact construction, so that the gear is overall small and compact in structure and only negligibly differs from gears of conventional electromotive auxiliary drives, which only present a gear stage formed by a worm gear, with regard to the overall dimensions.

The torque on the output shaft is adaptable to the respective requirements and indeed without modification of the gear and without alteration of the fundamental structure of the electric motor. Adaptation is performed, insofar as necessary, using different motor components (such as armature, stator magnets and pole pot, etc.). As a result of the adaptation, it is possible to use the wiper drive or motor in a windscreen wiper module either to directly drive a wiper lever or wiper arm or however to drive two wiper levers or wiper arms through an additional gear arrangement (e.g. lever gear).

The gear elements of the additional second gear stage, but also however those of the gear, may be manufactured all in all economically as simple components.

Further developments, advantages and application possibilities of the invention are also apparent from the following description of examples of embodiment and from the figures. In this case, all the characteristics described and/or illustrated are in themselves or in any desired combination fundamentally a subject of the invention, regardless of their summary in the claims or their backward relation. The contents of the claims are also made an integral part of the description.

The invention is described below in further detail in examples of embodiment based on the figures:

FIG. 4 shows a section according to the line I-I in FIG. 3;

Figure 1:
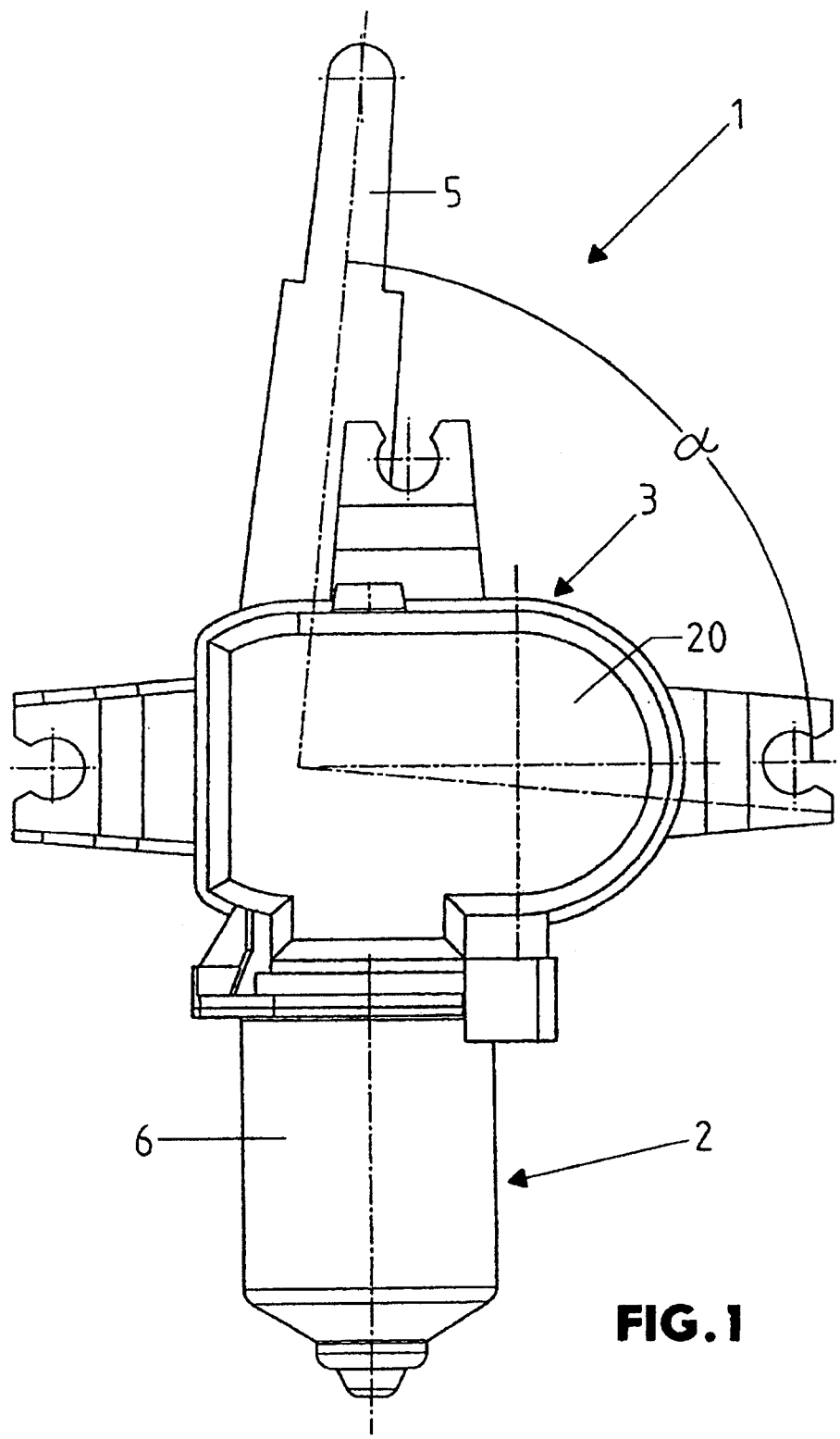
FIG. 1 shows a top view of the rear of an electromotive auxiliary drive according to the invention designed as a wiper drive or motor.

The electromotive wiper drive generally designated by 1 in the Figures comprises in an intrinsically well known manner and electric motor 2 and a gear 3. In the embodiment presented, the pinion shaft or output shaft 4 of the gear 3 forms the wiper shaft, on which the wiper arm 5 implied in FIG. 1 for a wiper blade not illustrated of a windscreen wiper module, for a vehicle rear windscreen for example, is fixed in a suitable manner.

The wiper drive 1 is designed as an electrically controlled reversing drive, i.e. as a drive in which during operation, the output shaft 4 and the wiper arm 5 at this position are periodically pivoted to and fro over an angle range α corresponding to the wiping angle of the windscreen wiper module by a controlled periodic change in the direction of rotation of the electric motor 2.

The electric motor 2 comprises among other aspects an armature shaft 7, one end of which is rotatably mounted in a cap-like motor housing 6, on which the motor armature 8 and a commutator 10 interacting with brushes on a brush plate 9. The other end of the armature shaft 5 extends into the gear housing 11 of the gear 3 and is rotatably mounted in this housing, to be more precise, at the transition between the motor housing 6 and the gear housing 11, i.e. where the motor housing 6 is flanged on the gear housing 11.

The gear housing 11, which in the same manner as the motor housing 6 is manufactured from a metallic material, is trough-like in design and to be more precise, essentially consists of a housing base 11.1 and a circumferential wall 11.2 surrounding the interior of the gear housing 11 with a flange section 11.3 for flange-mounting of the motor housing 6.

Over a partial length received in the gear housing 11, the armature shaft 7 is designed as a worm 7.1, which interacts with the toothing 12.1 of a worm wheel or gearwheel 12, which (gearwheel) forms in conjunction with the worm 7.1 a first multiplication and gear stage 13 inside the gear housing 11. The gearwheel 12 is arranged on a shaft 14, which is freely rotatably mounted with a friction bearing 14.1 in a bearing section 11.1.1 on the housing base 11.1 and to be more precise around an axis vertical to the axis of the armature shaft 7 and parallel to the axis of the output shaft 4.

A further gearwheel 15 designed as a toothed wheel is provided on the side of the gearwheel 12 facing away from the housing base 11.1 and to be more precise along the same axis as that of the gearwheel 12. The gearwheel 15, which presents a reduced external diameter in relation to that of the gearwheel 12, is drive-connected to the gearwheel 12; the gearwheels 12 and 15 are for instance manufactured from a suitable material, from a metallic material or a suitable plastic for example.

On the output shaft 4, which is likewise rotatably and pivotably mounted by means of a friction bearing 4.1 on the housing base 11.1 and on a bearing section 11.1.2 at this position, a toothed wheel or gearwheel segment 16 interacting with the gearwheel 15 inside the housing 11, the toothing 16.1 of which engages in the toothing 15.1 of the gearwheel 15. The gearwheel 15 and the gearwheel segment 16 form a second additional multiplication and gear stage 17.

Figure 2:
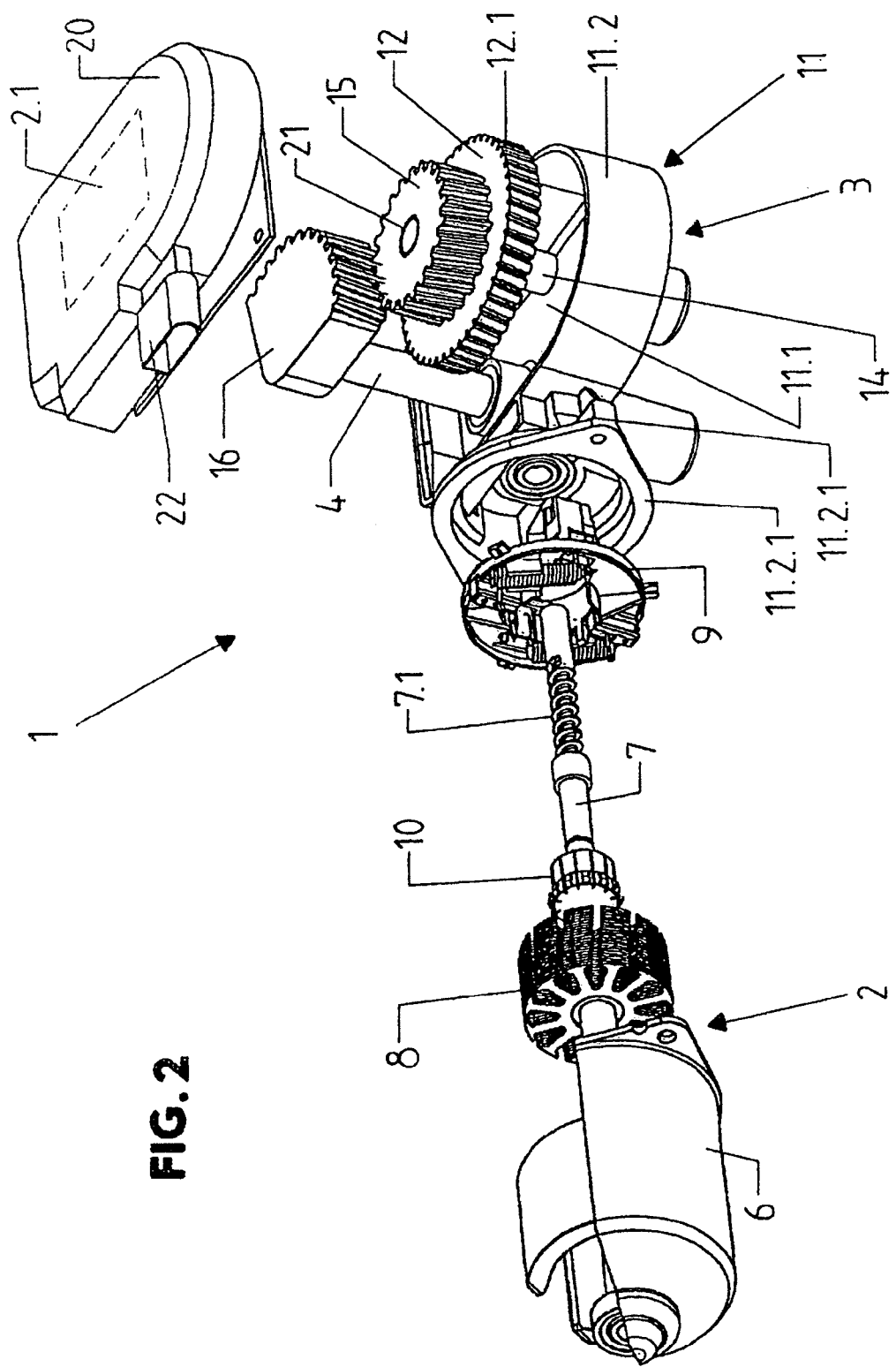
FIG. 2 shows the essential elements of the wiper drive in a perspective exploded view.

The gearwheel segment 16 possesses two surfaces 18 oriented approximately radially in relation to the axis of the output shaft 4, the angular distance of which is identical to or somewhat larger than the wiping angle α. The arrangement of the gear segment 16 within the gear housing 11 is selected such that the surfaces 18 respectively rest against a countersurface within the gear housing 11, i.e. in the embodiment presented, against a rubber buffer 19 provided on the internal surface of the circumferential wall of the housing 11.2, in the event that owing to a malfunction in the electronic control of the electric motor 2 or the motor control unit 2.1, which is implied by a broken line in FIG. 2, switchover of the direction of rotation of the electric motor 2 on reaching one of the angle end positions defining the wiping angle α does not occur.

The multiplication of the gear stage 17 is selected by a corresponding choice of the effective radii of the gearwheel 15 and the gear segment 16 such that the multiplication is smaller than one, i.e. a rotation of the gearwheel 15 by an angle of rotation results in a rotation or pivoting movement of the gear section 16 with a smaller angle of rotation. In the embodiment presented, the gear ratio of the additional gear stage 17 is approx. 0.6 and 0.7.

The joint axis of both gearwheels 12 and 15 and the axis of the output shaft 4 lie in a common plane E. The axis of the armature shaft 7 and therefore also the axis of the worm 7.1 are oriented vertically in relation to this plane E.

In the finally assembled state of the wiper drive 1, the open side of the gear housing 11 is tightly closed by a cover 20. The control electronics or motor control unit 2.1 for controlling the electric motor 2 and particularly also for controlling the reversing rotation of the electric motor 2 and the armature shaft 7 by reversing the polarity of the DC voltage applied to the electric motor 2 is provided on the inside of this cover.

With at least one sensor of the motor control unit 2.1, the rotational position of the gearwheel 15 and therefore the rotational or pivoting position of the output shaft 4 are monitored and at least switchover of the direction of rotation of the electric motor 2 on respectively reaching the end positions of the wiping angle α is induced. In the embodiment presented, a positional magnet 21 designed as a permanent magnet is provided on the gearwheel 15 and interacts with a sensor responding to the magnetic field of this magnet, for example a Hall sensor of the motor control unit 2.1. A multiport or multicontact plug 22 is provided on the outside of the cover 20, to be more precise, for connection of the wiper drive 1 to electrical supply and control lines on the vehicle side.

Figure 6:
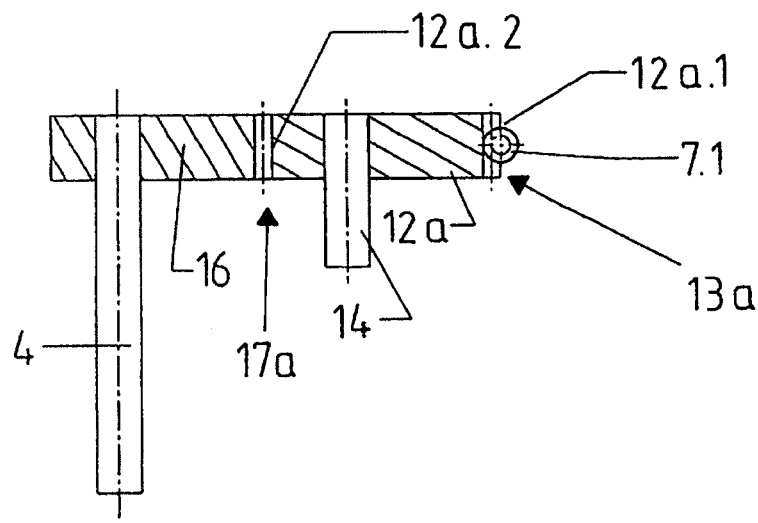
FIG. 6 shows a section according to the line A-A in FIG. 5.
Figure 5:
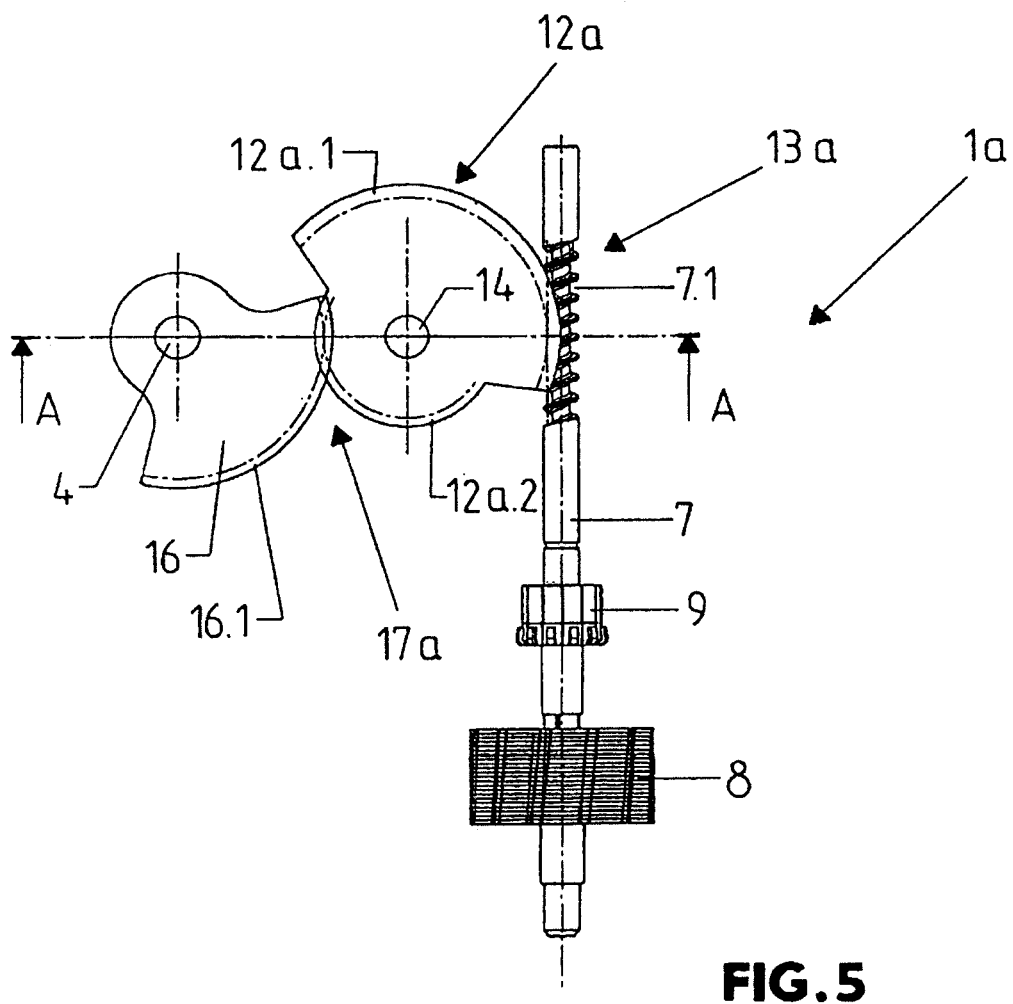
FIG. 5 shows a simplified presentation of the essential elements of a wiper drive or motor according to a further embodiment of the invention.

FIGS. 5 and 6 show as a further embodiment a wiper drive 1a, of which solely the essential functional elements are illustrated, i.e. among other aspects the armature shaft 7 with the armature 8 and commutator 9 and the worm 7.1 designed on the armature shaft 7, which in conjunction with the worm wheel or gearwheel 12a, forms the first gear stage 13a. The gear 3a of the wiper drive 1a essential differs from the gear 3 in that the gearwheel 12a of the first gear stage 13a is designed as a gearwheel segment at its section 12a.1 interacting with the worm 7.1 and at the toothing at this position and is simultaneously a component of the second gear stage 17a, i.e. it interacts with a second toothing at this position with the toothing 16.1 of the gearwheel segment 16 on the output shaft 4. The toothed wheel or gearwheel 15 is therefore omitted.

The segment-shaped sections 12a.1 and 12a.2 are diametrically opposed to one another in relation to the axis of the gearwheel 12a. Furthermore, the front faces of sections 12a.1 and 12a.2 oriented vertically in relation to the axis of the gearwheel 12a lie in common planes in the embodiment presented. The radius of section 12a.1 and the toothing at this position is greater than the radius of section 12a.2 and the toothing at this position. Through use of the gearwheel 12a, a further reduction in the installation space or volume for the gear 3a is achieved, particularly also in the axial direction of the output shaft 4.

Figure 3:
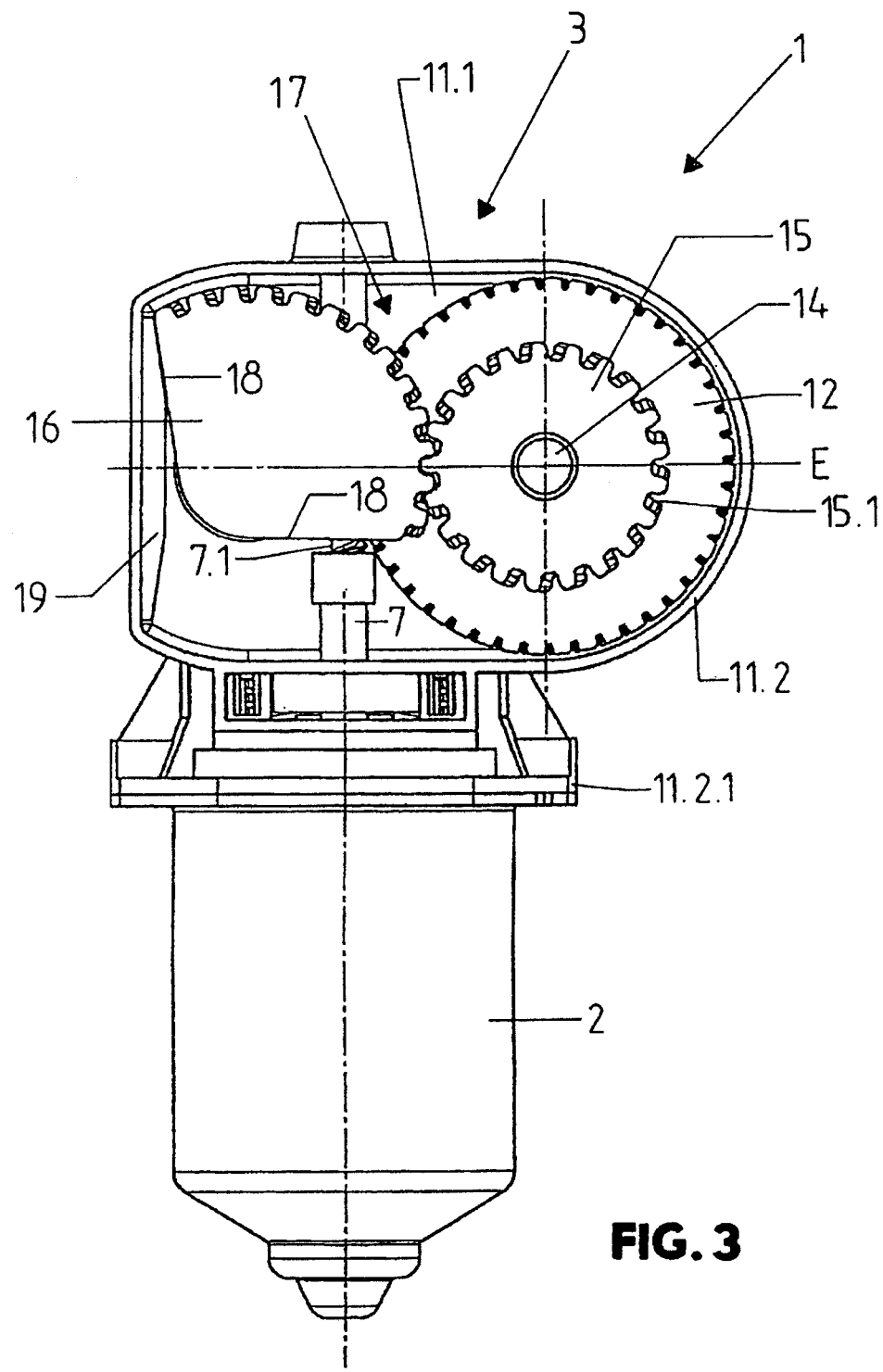
FIG. 3 shows an illustration similar to that of FIG. 1, but with the gear housing cover removed.

The advantages of the wiper drive 1 and 1a with the additional multiplication or gear stage 17 and 17a are, with a compact construction and reduced installation space for the gear 3 and 3a, among others, as follows:

- owing to the additional multiplication or gear stage 17 and 17a, an increased torque results on the output shaft 4 for the same torque of the electric motor 2 in comparison to wiper drives that do not present an additional multiplication or gear stage 17.
- Owing to the arrangement of the armature shaft 7 and the section of this armature shaft forming the worm 7.1 between the gearwheel 12 and 12a and the output shaft 4 and the bearing section 11.1.2 formed on the gear housing base 11.1 and likewise owing to the design of the gear element 16 provided as a toothed wheel segment on the output shaft 4, an extremely compact construction with a small installation space results for the gear 3 and 3a in spite of the additional gear stage 17 and 17a.
- The arrangement of the gearwheel segment 16 in such a manner that in the case of the gear 3, it partially overlaps the larger gearwheel 12 (FIGS. 3 and 4), in addition to the specific design of the gearwheel 12a and omission of the gearwheel 15 in the gear 3a considerably contributes to reducing the overall dimensions of the gear 3 and 3a.
- Owing to the additional gear stage 17 and 17a, self-locking of the output shaft 4 is furthermore improved.
- The gearwheels or gear elements 12, 12a 15 and 16 may be manufactured cheaply as relatively simple components.

The invention has been described above based on examples of embodiment. It is understood that modifications and variations are possible without departing as a result from the concept on which the invention is based.

It was therefore assumed above that the output shaft 4 of the wiper drive serves as a wiper shaft to which the wiper arm 5 of a windscreen wiper module is directly fixed. It is also of course possible to use the wiper drive 1 in windscreen wiper modules in which the output shaft 4 is drive-connected by a lever gear for example to one or however several wiper arms of a windscreen wiper module.

LIST OF REFERENCES 1, 1a wiper drive
2 electric motor
2.1 motor control unit
3, 3a gear
4 output shaft of the gear 3
4.1 friction bearing
5 wiper arm
6 motor housing
7 armature shaft
7.1 worm
8 armature
9 brush plate
10 commutator
11 gear housing
11.1 base of the gear housing 11
11.1.1 bearing section for additional shaft 14
11.2 circumferential wall of the shell-like gear housing
11.1.2 bearing section for output shaft 4
11.2.1 flange
12, 12a gearwheel
12.1 toothing
12a.1, 12a.2 section of gearwheel 12a
13, 13a gear stage
14 shaft
14.1 friction bearing
15 gearwheel
15.1 toothing
16 gearwheel segment
16.1 toothing
17, 17a gear stage
18 front face
19 rubber buffer
20 housing cover
21 positional magnet
22 multiport or multicontact plug on cover 20
α rotational or pivoting angle of the output shaft 4
E plane of the axes of shafts 4 and 14

The invention claimed is:

1. A wiper drive, comprising:
a wiper motor assembly, the wiper motor assembly comprising:
an electromotive auxiliary drive comprising:
an electric motor; and
a downstream gear stage comprising:
an output shaft of the auxiliary drive, and
at least two gear stages arranged in series in a drive train between the electric motor and the output shaft, of which a first gear stage comprises a worm and a worm wheel gear element interacting with the worm,
wherein a first gear element of a second gear stage is placed concentrically on top of the worm wheel gear element of the first gear stage, and
wherein the first gear element of the second gear stage contacts a partial gear mounted on the output shaft, wherein the partial gear is a gearwheel segment limited to an angle of less than 270°; and
a wiper element comprising a wiper arm, wherein the output shaft drives the wiper arm.

2. The wiper drive according to claim 1, wherein the second gear stage is provided in the drive train between the first gear stage and the output shaft.

3. The wiper drive according to claim 1, wherein the worm wheel gear element of the first gear stage is simultaneously also a gear element of the second gear stage and is designed on a first section for interaction with the worm and on at least a second section for interaction with a gear element of the second gear stage.

4. The wiper drive according to claim 1, wherein the worm wheel gear element of the first gear stage and the first gear element of the second gear stage are manufactured to form a unit or are connected in one piece.

5. The wiper drive according to claim 1, wherein the worm wheel gear element possesses a greater diameter than the first gear element of the second gear stage.

6. The wiper drive according to claim 1, wherein a gear ratio of the second gear stage lies within the range between 0.6 and 0.7.

7. The wiper drive according to claim 1, wherein an axis of the worm wheel gear element is arranged parallel to and at an interval from an axis of the output shaft, and the worm of the first gear stage or a partial length presenting this worm of an armature shaft of the electric motor is arranged between the output shaft or a bearing section formed on the gear housing for the output shaft and the worm wheel gear element.

8. The wiper drive according to claim 7, wherein the worm of the first gear stage or the partial length of the armature shaft presenting this worm is orthogonal with respect to the axis of the output shaft and orthogonal with respect to the axis of the worm wheel gear element.

9. The wiper drive according to claim 1, wherein the second gear element of the second gear stage is disposed on top of the worm wheel gear element of the first gear stage.

10. The wiper drive according to claim 1, wherein the output shaft and the worm wheel gear element of the first gear stage and the first and the second gear elements of the second gear stage are mounted on a housing base of a gear housing.

11. The wiper drive according to claim 10, wherein the gear housing is closed by a housing cover on a housing side opposite the housing base and the electric or electronic motor control unit is provided on the housing cover.

12. The wiper drive according to claim 1, wherein, on the first gear element of the second gear stage arranged along a common axis with the worm wheel gear element, at least one control element interacting with an electric or electronic motor control unit is provided for controlling the electric motor depending on a rotational or pivoting position of the first gear element of the second gear stage.

13. The electromotive auxiliary drive according to claim 12, wherein the at least one control element is at least one selected from the group consisting of a permanent magnet, a control cam and a curve.

* * * * *